United States Patent [19]

Gumm

[11] Patent Number: 4,688,253
[45] Date of Patent: Aug. 18, 1987

[54] L+R SEPARATION SYSTEM
[75] Inventor: Linley F. Gumm, Beaverton, Oreg.
[73] Assignee: Tektronix, Inc., Beaverton, Oreg.
[21] Appl. No.: 889,490
[22] Filed: Jul. 28, 1986
[51] Int. Cl.$^4$ ............................................. H04H 5/00
[52] U.S. Cl. ...................................................... 381/7
[58] Field of Search ............................ 381/1, 7, 2, 3, 4

[56] References Cited

U.S. PATENT DOCUMENTS 3,962,551 6/1976 Gay ......................................... 381/7
4,539,697 9/1985 Ishida et al. ............................ 381/7

*Primary Examiner*—Forester W. Isen
*Attorney, Agent, or Firm*—Francis I. Gray

[57] ABSTRACT

An L+R separation system separates the L+R component of a composite stereo signal, such as a BTSC signal or an FM broadcast stereo signal, from the L−R suppressed subcarrier component by sampling the composite stereo signal at a rate which is twice the frequency of the L−R component subcarrier frequency. The sampling signal, which is derived from the composite stereo signal, is synchronized with the subcarrier frequency such that the sampling occurs at the zero crossings of the subcarrier frequency, eliminating the L−R component from the sampled output. A simple lowpass filter recovers the L+R component.

3 Claims, 6 Drawing Figures

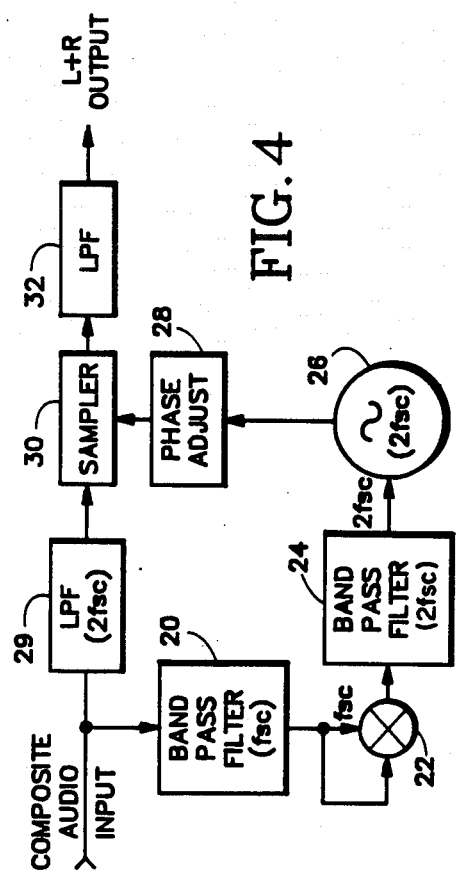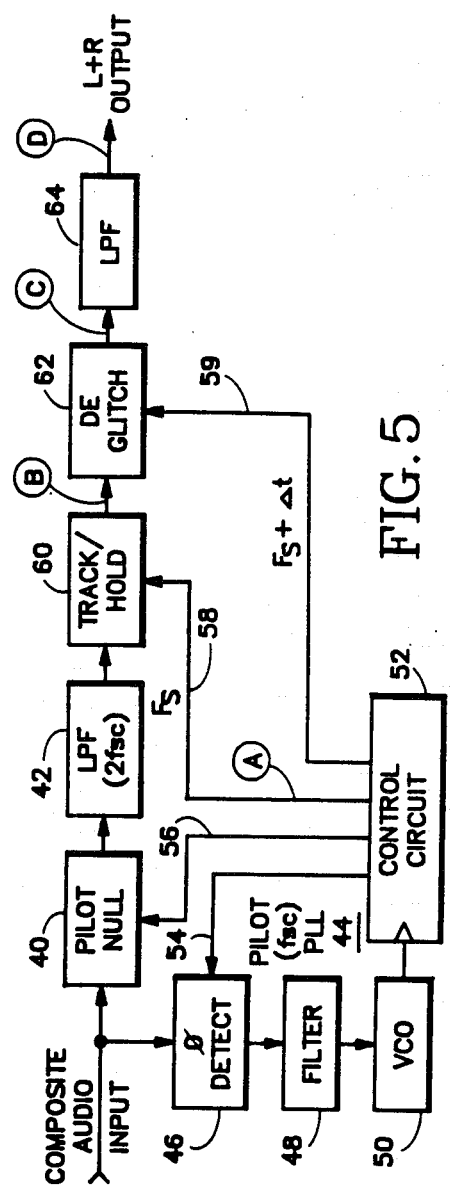

L+R SEPARATION SYSTEM

BACKGROUND OF THE INVENTION

The present invention relates to signal separation circuits, and more particularly to an L+R measurement system for separating the L+R component from a composite stereo signal.

When decoding stereo signals in either the broadcast FM or BTSC stereo systems, it is often desired to obtain the monaural L+R component from the composite signal. This may be done to measure the amplitude or other characteristics of this component, or as part of a decoding process. The BTSC system for television defines a main audio L+R channel up to 15 kHz, a pilot signal at the horizontal sweep frequency of 15.734 kHz, and a double sideband, suppressed carrier stereo subchannel symmetrically about a subcarrier frequency which is twice the pilot signal frequency from about 16.470 kHz to 46.47 kHz. The BTSC stereo signal can be written as:

$$Vc(t) = (Vl(t) + Vr(t)) + 2K(Vl(t) - Vr(t)) \sin(2pi*Fs*t) + Ve$$

where Vc(t)=BTSC composite stereo signal; Vl(t)=left channel signal=L; Vr(t)=right channel signal=R; K=gain coefficient of the dbx noise reduction system; 2 pi=6.283183 . . . ; Fs=stereo subcarrier frequency; and Ve=everything else such as the pilot, the second language channel and the operations channel (SCA in broadcast FM). The user of a modulation monitor desires to read the amplitude of the stereo sum term L+R. To design lowpass filters for this system requires filter performance several orders of magnitude beyond performance adequate for an FM broadcast stereo system. The guardbands between the main channel, the pilot signal and the subchannel are much narrower, and a dbx noise reduction compressor is placed in the subchannel, increasing the potential for subchannel to main channel crosstalk. The guardbands between the main channel and the pilot signal and between the pilot signal and the subchannel are only 734 Hz each, with the separation between the main channel and the subchannel being 1.468 kHz. Thus, a significant factor in channel separation is the subchannel to main channel crosstalk.

Subchannel to main channel crosstalk occurs when the lower sideband of the subchannel leaks into the main channel due to inadequate low pass filtering of the audio that modulates the subchannel. This crosstalk is nonlinear, i.e., it is highly offensive to the ear because it is not harmonically related to the main channel signals. Additionally when the signal levels are low but the program material contains substantial L−R content, the dbx noise reduction compressor can cause subchannel levels to be 20-30 dB higher than main channel levels. In this situation the main channel has negligible ability to psychoacoustically mask the crosstalk. Further the greatest gain by the dbx noise reduction system is likely to be produced at high frequencies—the very frequencies that appear at the edge of the lower sideband and which are most likely to cause audible crosstalk.

Filters that will pass the sum term and reject the difference term must have such sharp cutoff characteristics that they will ring and overshoot when pulse tested, resulting in erroneous peak readings. High performance filters which are adequate for the BTSC system also are quite complex, one such having as many as 29 poles of filtering overall, are expensive and require great stability.

What is desired is an L+R separation system which separates the L+R component from the composite stereo signal without having stringent filtering requirements.

SUMMARY OF THE INVENTION

Accordingly the present invention provides an L+R separation system which obtains the L+R monaural component from a composite stereo signal, such as BTSC or FM broadcast stereo, by time domain sampling the composite signal at appropriate points. A sampling signal is generated from the composite stereo which has a frequency twice the subcarrier frequency of the L−R component of the composite stereo. The sampling signal is used to sample the composite stereo at the zero-crossing times of the subcarrier, i.e., at times when the L−R component is zero. The resulting signal is then filtered using a simple low pass filter to obtain the L+R component.

The objects, advantages and novel features of the present invention will be apparent from the following detailed description when read in conjunction with the appended claims and attached drawing.

BRIEF DESCRIPTION OF THE DRAWING

FIG. 4 is a more detailed block diagram view of one embodiment for an L+R separation system according to the present invention.

FIG. 5 is a more detailed block diagram view of another embodiment for an L+R separation system according to the present invention.

DESCRIPTION OF THE PREFERRED EMBODIMENT

Figure 1:
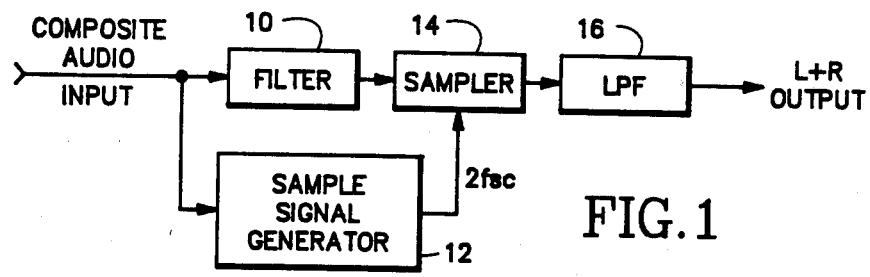
FIG. 1 is a block diagram view of an L+R separation system according to the present invention.

Referring now to FIG. 1 a composite stereo signal is input to an input filter circuit 10 and to a sampling signal generator 12. The input filter circuit 10 suppresses the pilot frequency, if any, which for the BTSC system is the television horizontal sync rate of 15.734 kHz, and passes the L+R and L−R components to a sampling circuit 14. The sampling signal generator 12 outputs a sample pulse stream at a frequency which is twice the subcarrier frequency for the suppressed subcarrier (L−R) component of the composite stereo signal and which is synchronized with the subcarrier frequency such that the sample pulses occur at points where the L−R component is zero, i.e., the zero-crossing points of the subcarrier frequency. The resulting output, devoid of the L−R component, is then filtered by a lowpass filter 16 to recover the L+R component.

The circuit of FIG. 1 treats the composite stereo signal after removal of the extraneous signals by the input filter circuit 10, leaving only the stereo sum and difference terms. The unique feature of the stereo difference signal is that it is amplitude modulated onto a suppressed carrier. At the zero crossings of the suppressed carrier the instantaneous value of the stereo difference term is zero, regardless of the amplitude of the left or right signals impressed upon it. Therefore if the composite signal is sampled at a 2Fs rate in time with the zero crossings of Fs, the stereo sum term can be recovered and easily separated from the rest of the signals.

To show the effect of the sampling system the time representation of the sampling waveform is transformed into the frequency domain, modified and transformed back into the time domain in a new form. The sampling waveform Vs is represented as a summation of a series of impulses which are offset from each other by the period of the sampling frequency:

$$Vs(t) = \sum_{n=-\infty}^{n=\infty} \delta(t - n/Fa) \text{ for all } n$$

where $\delta(x)$ = a unit impulse at $x=0$, $\delta(t-n/Fa)$ being a series of impulses separated by $t=1/Fa$. The Fourier transform of this is another series of impulses separated in frequency by Fa (ignoring any scaling constants):

$$Vs(s) = \Sigma \delta(s - n*Fa) \text{ for all } n.$$

Observing that the inverse Fourier transform of $\delta(s)$ is 1 and that the inverse transform of $\delta(s-x)+\delta(s+x)$ is 2 Cos (2pi*t), transforming the sampling series back into the time domain (again ignoring any scaling constants) produces:

$$Vs(t) = 1 + \sum^{n>0} \text{Cos}(2pi*n*Fa*t) \text{ for } n > 0.$$

The sampling of the composite signal may be expresse as:

$$Vo(t) = Vc(t) * Vs(t)$$

$$Vo(t) = \{(L+R) + 2K(L-R) \text{ Sin } (2pi*Fs*t)\} * \{1 + \Sigma \text{ Cos } (2pi*n*Fa*t)\}$$

Setting K = 1, Fa = 2Fs and doing a term by term expansion of the first few terms of the infinite series:

$$Vo(t) = (L + R) + 2K(L - R)\text{Sin}(2pi*Fs*t) +$$
$$(L + R)\text{Cos}(2pi*2Fs*t) +$$
$$2(L - R)\text{Sin}(2pi*Fs*t)\text{Cos}(2pi*Fs*t) +$$
$$(L + R)\text{Cos}(2pi*4Fs*t) +$$
$$2(L - R)\text{Sin}(2pi*Fs*t)\text{Cos}(2pi*4Fs*t) +$$
$$(L + R)\text{Cos}(2pi*6Fs*t) +$$
$$2(L - R)\text{Sin}(2pi*Fs*t)\text{Cos}(2pi*6Fs*t) + \ldots$$

Since $\text{Sin}(x)\text{Cos}(y) = \frac{1}{2}(\text{Sin}(x + y) + \text{Sin}(x - y))$
$= \frac{1}{2}(\text{Sin}(x + y) - \text{Sin}(y - x))$, simplifying:

$$Vo(t) = (L + R) + 2K(L - R)\text{Sin}(2pi*Fs*t) +$$
$$2(L + R)\text{Cos}(2pi*2Fs*t) +$$
$$(L - R)[\text{Sin}(2pi*3Fs*t) - \text{Sin}(2pi*Fs*t)] +$$
$$2(L + R)\text{Cos}(2pi*4Fs*t) +$$
$$(L - R)[\text{Sin}(2pi*5Fs*t) - \text{Sin}(2pi*3Fs*t)] +$$
$$2(L + R)\text{Cos}(2pi*6Fs*t) +$$
$$(L - R)[\text{Sin}(2pi*7Fs*t) - \text{Sin}(2pi*5Fs*t)] +.$$

All the Sin terms cancel, leaving:

$$Vo(t) = (L + R) + 2(L + R)\text{Cos}(2pi*2Fs*t) +$$
$$2(L + R)\text{Cos}(2pi*4Fs*t) + 2(L + R)\text{Cos}(2pi*6Fs*t) + \ldots$$

The result of the sampling is the stereo sum term L+R plus this same term modulating the even harmonics of the subcarrier frequency. The bandwidth of the stereo sum term is about Fs/2 and the modulation sidebands extend down from 2Fs by Fs/2. Therefore the lowpass filter 16 has to pass Fs/2 and reject 3Fs/2, a ratio of three to one, requiring a greatly simplified filter.

Figure 2:
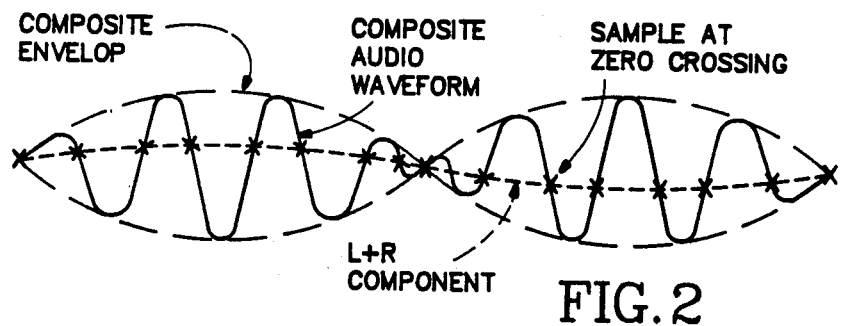
FIG. 2 is a waveform diagram view of the composite stereo signal illustrating the operation of the present invention.
Figure 3:
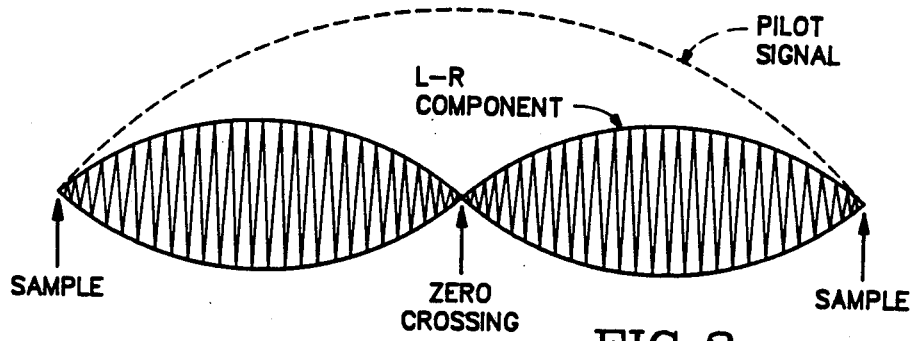
FIG. 3 is a waveform diagram view of the L−R component of the composite stereo signal illustrating the operation of the present invention.

FIGS. 2 and 3 illustrate graphically the above mathematical derivation. FIG. 2 illustrates a composite stereo waveform which is sample at the zero crossings of the subcarrier frequency to obtain the L+R component while FIG. 3 illustrates that at the zero crossings of the subcarrier frequency the values of the L−R component are zero.

FIG. 4 illustrates an embodiment of the present invention which derives the sampling signal from the difference component. The composite stereo signal is input to a pass filter 20 which is centered around the subcarrier frequency. The output of the pass filter 20 is input to a multiplier 22 configured as a squaring circuit. The output of the multiplier 22 is then input to another pass filter 24 centered around a frequency which is twice the subcarrier frequency. The resulting frequency from the second pass filter 24 is used to injection lock an oscillator 26 having a frequency which is twice that of the subcarrier. The output of the oscillator 26 is the sampling signal which is input to a phase adjustment circuit 28 to compensate for any phase shifts introduced by the previous circuitry so that the sampling signal is in synchronism with the suppressed subcarrier of the difference component of the composite stereo signal.

The composite stereo signal is also input to a sampling circuit 30 where it is sampled by the sampling signal from the phase adjustment circuit 28. Since the sampling signal is in synchronism with the suppressed carrier, the composite stereo signal is sampled at the zero crossing points of the subcarrier, i.e., where the L−R component is zero. The remaining component from the sampling circuit 30 is input to a low pass filter 32 to recover the L+R component as an output.

As shown in FIG. 5 a composite stereo signal having a pilot signal, such as the BTSC signal, is input to a pilot canceller circuit 40 to remove the pilot signal and then to a lowpass filter 42 to remove extraneous channels at higher frequencies, as is conventional. The composite stereo signal is also input to a phase lock loop 44 having a phase detector 46, a filter 48 and a voltage controlled oscillator (VCO) 50. The output of the VCO 50 is input to clock a control circuit 52, which may typically be a programmable array logic (PAL) integrated circuit. The control circuit 52 generates control signals in the form of pulse series of various frequencies. One output 54 of the control circuit 52 closes the phase lock loop 44 by inputting to the phase detector 46 for comparison with the pilot signal. A second output 56 from the control circuit 52 is input to the pilot canceller circuit 40 to eliminate the pilot signal from the composite stereo signal to be processed. A third output 58 is a sampling waveform with a sample rate of twice the subcarrier frequency. A fourth output 59 is the sampling waveform offset in time by a small amount dt.

Figure 6:
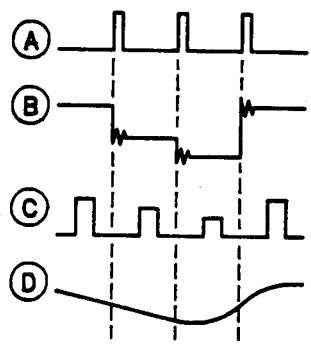
FIG. 6 is a waveform diagram view for the system of FIG. 5.

The sampling output 58 is input to a track/hold circuit 60 to which is also input the composite signal containing only the L+R and L−R components of the composite stereo signal. Since the sampling waveform 58 is synchronized with the pilot signal via the phase locked loop 44, the pulses of the sampling waveform gate the track/hold circuit 60 at the zero crossing times of the subcarrier frequency. As shown in FIG. 6 the resulting output of the track/hold circuit 60 is a series of steps having some noise at the sampling frequency at the step transitions. The step output is then input to a deglitch circuit 62 which converts the series of steps, in response to the fourth output 59, into a series of pulses whose amplitude is equivalent to the amplitude of the respective steps. The time increment dt is chosen so the pulses are output after the settling time of the noise prior to any appreciable decay of the step. The L+R steps are input to a conventional lowpass filter 64 which converts the pulses into the analog L+R waveform upon which desired measurements can now be taken.

Thus the present invention provides an L+R separation system which synchronously samples a composite L+R and L−R signal at the zero crossings of the L−R subcarrier frequency to eliminate the L−R component, the remaining L+R component being readily recovered with a simple lowpass filter.

What is claimed is:

1. A separation system for recovering the sum component of a composite stereo signal having a sum component and a suppressed subcarrier difference component comprising:

means for generating from the composite stereo signal a sampling signal in synchronism with the suppressed subcarrier;
  means for sampling the composite stereo signal with the sampling signal each time the suppressed subcarrier of the difference component is zero to eliminate the difference component, the output of the sampling means containing the sum component; and
  means for recovering the sum component from the output of the sampling means.

2. A measurement system as recited in claim 1 wherein the generating means comprises:

means for selecting a portion of the composite stereo signal from which the sampling signal is to be generated; and
  means for deriving from the selected portion the sampling signal which is at a frequency twice that of the suppressed subcarrier and is in synchronism with the suppressed subcarrier.

3. A measurement system as recited in claim 1 further comprising means for separating a composite of the sum and difference components from the composite stereo signal, the composite of the sum and difference components being input to the sampling means.

* * * * *